United States Patent [19]

Ramshaw

[11] Patent Number: 4,770,753
[45] Date of Patent: Sep. 13, 1988

[54] ELECTROCHEMICAL CELL

[75] Inventor: Colin Ramshaw, Warrington, England

[73] Assignee: Imperial Chemical Industries PLC, London, England

[21] Appl. No.: 870,862

[22] Filed: Jun. 5, 1986

[30] Foreign Application Priority Data

Jun. 18, 1985 [GB] United Kingdom ............... 8515383

[51] Int. Cl.⁴ .................. C25B 9/00; C25B 11/03; C25B 15/08
[52] U.S. Cl. ...................... 204/212; 204/256; 204/258; 204/265; 204/266; 204/268; 204/269; 204/277; 204/278; 204/284
[58] Field of Search ............. 204/212, 284, 255–258, 204/263–266, 275–278, 269; 429/69

[56] References Cited

U.S. PATENT DOCUMENTS

3,119,759  1/1964  Hoover .......................... 204/212
3,196,095  7/1965  Wadsworth .................. 204/212 X
3,840,453  10/1974  Cooper et al. ................ 204/212

Primary Examiner—Donald R. Valentine
Attorney, Agent, or Firm—Cushman, Darby & Cushman

[57] ABSTRACT

An electrode assembly for effecting electrochemical reaction between two fluid phases, the first of which is liquid, which apparatus is characterized by
an electrode permeable to the fluids,
means for containing the first fluid phase in contact with the electrode,
means for charging the second fluid phase to the electrode
means for removing a reaction product of the two phases from the electrode, and
means for rotating the electrode about an axis, such that when the second fluid phase is charged to the electrically charged, rotating electrode permeated with the first fluid phase, the second fluid phase permeates the electrode from the point of charging and the reaction product is removed from the electrode; a series cell cascade comprising at least two such electrode assemblies in series; and a process for effecting electrochemical reaction between two fluid phases, one of which is a liquid, using such an electrode assembly.

7 Claims, 4 Drawing Sheets

ELECTROCHEMICAL CELL

This invention relates to an electrode assembly for electrochemical reactions, to a cell cascade comprising a plurality of such assemblies, and to processes for electrochemical reactions using such an assembly or cascade.

Inter-phase electrochemical reactions at electrodes, for example between a gas and a liquid, are known. Examples of such gas-liquid reactions include those which reduce hydrogen overpotential, and electrosynthesis. Ensuring adequate inter-phase and phase-electrode contact for adequate reaction poses a problem. We have now found a means for, unexpectedly, enhancing the necessary contact and hence the inter-phase reaction.

Accordingly the present invention provides an electrode assembly for effecting electrochemical reaction between two fluid phases, the first of which is liquid, which apparatus is characterised by an electrode permeable to the fluids, means for containing the first fluid phase in contact with the electrode, means for charging the second fluid phase to the electrode means for removing a reaction product of the two phases from the electrode, and means for rotating the electrode about an axis, such that when the second fluid phase is charged to the electrically charged, rotating electrode permeated with the first fluid phase, the second fluid phase permeates the electrode from the point of charging and the reaction product is removed from the electrode.

The invention also provides a process for effecting electrochemical reaction between two fluid phases, the first of which is a liquid, characterised by charging the second fluid phase to an electrically charged rotating permeable electrode permeated with the first fluid phase, so as to permeate the electrode and first fluid phase from the point of charging with the second fluid phase.

By "fluid" we mean a substance or a mixture of substances, which is a gas or a liquid at the conditions of temperature and pressure at which the apparatus of the invention is operated. For example, where the second fluid is a gas it may be one gas or a mixture of gases; the first fluid and/or the second fluid (where it is a liquid) may be a neat liquid or may be a solution of one or more solutes in the liquid, which solute may be a gas, liquid or solid, subject always to the proviso that the two phases are capable of electrochemical reaction.

For example the second fluid may be oxygen or air, the first fluid may be a solution of solid sodium hydroxide in water, and the electrode may be a cathode. In this case the electrochemical reaction will be oxidation of hydrogen or hydrogen ion to water to reduce the hydrogen ion over potential. The water may be removed.

Alternatively, the second fluid may be an alkene, the first fluid may be a solution of solid sodium chloride in water, and the electrode may be an anode. In this case the reaction (an electrosynthesis) will be the reduction of chlorine or chloride ion to halogenated alkanes which may be removed.

In a further possibility, one or two electrodes in accordance with the invention may be used (as a cathode, or as a cathode and anode respectively) in a fuel cell. The cells often have a cathode where the second fluid is air or oxygen, the first fluid is an aqueous electrolyte and the reaction is the oxidation of hydrogen ion to water.

Where the elctrolyte contains methanol, this is oxidised at an anode not perfused with any gas to carbon dioxide.

Alternatively, an anode in accordance with the present invention may be charged with hydrogen which is anodically oxidised to water, or charged with a hydrocarbon gas such as a $C_{1-4}$ alkane or a mixture thereof which is anodically oxidised to carbon dioxide.

As discussed further hereinafter, the radial movement of the second fluid depends directly on relative densities of the two fluids, and depends on their relative flow rate, although it may also be assisted by applying a pressure drop to one or both fluids. It is generally preferred for economic reasons to minimise the need for an applied pressure drop, for example by maximising the difference in density of the two fluids. Since the first fluid is a liquid, this means that the second fluid is generally a gas.

The permeable electrode may be a plurality of discrete components which contact to conduct electric current, or an integral whole. Where the permeable element comprises a plurality of discrete components, preferably they are mutually contacting fibres, e.g. as carbon or metal gauzes or felts, in which case the interstices of the permeable electrode are between the components. Less favourably, the individual components may be permeable, e.g. open-ended metal tubules in which case a proportion of the interstices are through the components and a proportion of the interstices are between the components. The permeable element is not usually an integral whole, but if so, it may be formed with pores, e.g. cast as a block with pores; or have pores formed therein, e.g. cast as a solid block and pores drilled therein; or be arranged to form pores between the parts thereof, e.g. a coil of wire.

While the permeable electrode may have straight pores, e.g. it may comprise aligned glass tubules or a metal or carbon block with channels drilled therein. Preferably the permeable electrode has tortuous pores through which the fluids flow, e.g. the abovementioned random gauzes or felts or mass of fibres, or it may be a coil of woven tape, a sintered mass, knitted or woven wire cloth, a crumpled mesh, skeleton foam, or particles. Where fibres are employed they may all have the same size and shape, or the sizes and/or shapes may be random, or the size and/or shape may be ordered.

Gauzes and felts are preferred since they have a relatively large specific surface area and voidage, which tend to maximise the conductivity of any cell containing the electrode and the scale of the desired electrochemical reaction, and give a good shear mixing of the two phases, when the second or both move(s) through them, to reduce diffusion control of the inter-phase reaction rate.

Electrodes with relatively large specific surface areas and voidages are generally favoured. By 'relatively large specific surface area' we mean the surface area of the permeable electrode per unit volume of permeable electrode is at least 200 $m^{-1}$, preferably more than 1500 $m^{-1}$ and more preferably more than 3000 $m^{-1}$. Typical voidages are at least 85%, and preferably more than 90%. Complementary fibre diameters (mean) are in the range of 2 to 25 u, typically 2 to 10 u for carbon fibres and 7 to 25 u for metal fibres.

The permeable electrode may be formed from any material which has the mechanical strength to withstand the stress generated in the material during rotation of the permeable electrode at the rotational speeds employed (discussed hereinafter). Preferably the material is resistant to attack by or reaction with the fluids with which it is in physical contact. Typically, the material from which the permeable element is formed is carbon, optionally coated with conventional electrode coatings therefor, such as chemically resistant metals such as silver, platinum or platinum black or metal oxides, for example platinum oxide; a conductive or conductively coated plastic or ceramic; or a chemically resistant metal, e.g. stainless steel, nickel, titanium or tantalum. The electrode may thus be a composite of two or more materials in an appropriate disposition or a single material. It may in addition have a conventional electrocatalytic coating.

Where, as may often be the case, the electrode is not mechanically self-supporting, e.g. it comprises an integral whole arranged to form pores between the parts thereof, or a plurality of discrete components, such as a felt, means to retain the permeable element in a desired shape and/or position in the rotating assembly and to maintain its permeability are often necessary. The said means is preferably in the form of at least one member, the or each member being rotatable about the same axis as the permeable electrode (hereinafter "rotatable member") and the permeable electrode being retained by one member or two or more members in cooperation.

The member or members may also or alternatively serve to form means for containing the first fluid phase in contact with the electrode, for example an electrode chamber to contain and/or channel the first and/or second fluids.

The permeable electrode may have a plane of symmetry in which the axis of rotation lies, e.g. it may be in the form of a permeable slat which is rotated about an axis perpendicular to the axis of the slat and distant from the mid-point thereof. Preferably the permeable element has a plurality of planes of symmetry which intersect at a line co-incident with the axis of rotation, e.g. it may be in the form of a permeable slat which is rotated about an axis perpendicular to the axis of the slat and co-incident with the mid-point thereof. More preferably the permeable electrode has an axis of symmetry which co-incides with the axis of rotation, e.g. the permeable electrode may be in the form of an annulus which is rotated about its axis of symmetry so that the electrode is fully dynamically balanced in rotation. Where the permeable element is in the form of an annulus the outer diameter of the annulus is typically in the range 250 mm to 1.25 meters, and the inner diameter is typically in the range 50 mm to 60 mm.

While the axis of rotation may be horizontal or vertical or at any angle between, it is often convenient to have the axis horizontal. Where a permeable electrode in the form of an annulus is employed, typically rotary movement is applied to it by a shaft projecting from the plane of the annulus along the axis thereof. The permeable electrode may be rotated by, for example, a variable speed fluid drive, a pulley which may be driven by a belt from an electric motor, or by turbo-propulsion.

As the specific surface area for any particular permeable electrode is increased, the necessary applied pressure drop across the permeable electrode increases and the possibility of starvation of the electrode of the second fluid increases. Simple experiment will readily reveal a suitable permeable electrode for any desired speed of rotation and fluid combination.

Where at least one rotatable member is employed to retain the electrode and/or to form an electrode chamber, the permeable electrode may be disposed throughout or in part of the member or throughout between, or between parts of, two members.

The size of the permeable electrode and its disposition in the rotatable member may be determined by the density and the interfacial area of the permeable element and by the flow characteristics of the fluids.

The or each rotatable member will generally have or comprise the same, or similar, form as the permeable electrode, and preferred forms and the reasons therefor will be as described for the electrode hereinbefore. Thus where the electrode is an annulus, the rotatable member will often comprise a disc, by which the electrode is clamped axially against e.g. another such disc, with an annulus between the discs which surrounds the outer periphery of the electrode.

Each rotatable member, for whatever reason it is used, may be constructed of any material or combination of materials which has (a) the mechanical strength and creep resistance to withstand the stress generated in the material during rotation of the rotatable member at the rotational speeds employed and (b) the corrosion resistance to tolerate the environments with which the rotatable member may be in contact during use. Typical materials from which each rotatable member may be constructed include inter alia plastics which are not degraded in the electrode environment, such as halogenated or some halogenatable polymers such as PVC, chlorinated PVC, chlorinated rubbers and chloroprene rubbers and PTFE composites, and some engineering plastics such as ABS; graphite; and metals such as titanium and nickel. The material of any given part of the rotatable member will also be determined by its other functions, e.g. whether it needs to be conductive or not. Choice of a suitable material will present no problem to those skilled in the art.

Where, as is usual, the second fluid is the less dense of the two, the speed at which the permeable electrode is rotated will depend on the maximum practical hydrostatic pressure which must and can be overcome to permeate the electrode with the second fluid; this in turn depends on the radial distance over which the second fluid flows in the permeable electrode.

The minimum speed at which the permeable electrode is rotated is often determined by the flow characteristics of any liquid phase. The maximum speed at which the permeable electrode may be rotated is governed by the mechanical strength of the permeable electrode, and/or of each rotatable member. Where the or each rotatable member is or comprises a disc in or between which an annular permeable electrode is disposed throughout, the speed of rotation will be: for a disc of 0.5 meters diameter, 1000–3000 rpm; for a disc of 1 meter diameter, 500–2000 rpm; for a disc of 1.5 meters diameter, 400–1000 rpm. Average centrifugal acceleration of the fluids in the electrode is then typically in the range 20 to 1000 g.

The direction of flow of the second fluid in the process according to the present invention will depend on the relative densities of the two fluids, and on their relative flow rates. As noted hereinbefore, for the first reason the second phase is generally a gas.

Where, as is preferred, the permeable electrode has a relatively high specific surface area it may require a relatively high applied pressure drop to permeate the electrode with the liquid first fluid. Thus, where there is no risk of depletion of the first fluid or a reactant or electrolyte component thereof by a low first fluid flow rate through the electrode, a zero or low total radial flow velocity is acceptable and may be desirable.

Where the second fluid is a gas and the first fluid has a zero or low total radial flow velocity (e.g. a U-shaped or C-shaped radial path, as will often be the case and is preferred) the second fluid will tend to flow radially inwards (Embodiment A). This is often facilitated and enhanced by increasing the speed of rotation of the permeable electrode.

In theory, the apparatus of the present invention in its broadest aspects could be operated using a denser second fluid, with radially outward flow of the second fluid and/or with the first fluid flowing radially inwards or outwards. In the latter case, suitable and routine choice of the fluids, their radial flow velocities and the speed of electrode rotation could be made for co- or counter-current flow of the two fluids.

Where Embodiment A is employed as is usual it will be appreciated that means are necessary distant from the axis of rotation and preferably adjacent to the radially outer perimeter of the permeable electrode to charge the permeable electrode with the second fluid. Such charging means typically comprise at least one charging orifice in a radially outer wall of an electrode chamber formed by one or more rotatable members. Preferably the electrode chamber is rotatably supported in a housing to form a space between the electrode chamber radially outer surface and the housing inner surface from which space the second fluid may be charged via a plurality of charging orifices to the permeable electrode.

It will be appreciated that even if the first phase is not depleted by the reaction, it may be depleted by entrainment with the reaction product and/or second fluid phase leaving the electrode and/or its chamber. This necessitates means to deliver the first fluid to the permeable element which also typically comprises an orifice in an electrode chamber wall through which the fluid may flow.

The delivery means is conveniently an orifice in a radially inner wall of an electrode chamber, although we do not exclude the possibility that it may be located elsewhere between the axis of rotation and the outer perimeter of the rotatable member. Preferably the delivery orifice communicates with a space extending axially through the electrode assembly, for example the interior of a hollow shaft (which also serves to rotate the electrode assembly), to which the first fluid may be charged conventionally. Where either fluid is a mixture of components, these may be delivered to the permeable electrode through the same or separate delivery means, e.g. they may be delivered through concentric or adjacent tubes.

Means for removing a reaction product of the two phases from the electrode will often also serve as an outlet means for the second fluid and/or first fluid which has or have permeated the electrode. In Embodiment A this product removal means is conveniently a plurality of outlet orifices in a radially inner wall of an electrode chamber. Where the first fluid delivery orifice is also in a radially inner wall of an electrode chamber it is convenient that there is a single annular inner wall with the plurality of outlet orifices disposed uniformly around part, e.g. half, of the periphery and with the delivery orifice in the other part.

Preferably the outlet means communicates with an axially extending space similar to and adjacent to or coaxial with the first fluid delivery space described above, and from which a reaction product and/or first and/or second fluid run-off may be collected.

The residence time of the second fluid within the permeable electrode is a function of the radial dimensions of the permeable electrode, the nature and permeability of the permeable electrode, the rotational speed, and the flow rate of the fluids. These parameters interact with each other and affect the residence time. For example, where the radius is increased and the other parameters kept constant the residence time is increased; where the flow rate is increased and the other parameters kept constant the residence time is reduced; where the rotational speed is increased and the other parameters kept constant the residence time is reduced.

In order to put into effect the process of the invention described hereinbefore, the electrode assembly is used in an electrochemical cell. It will be appreciated that the permeable electrode of the present invention may be a cathode or an anode, or both electrodes may be an electrode of the present invention. It is greatly preferred that, whether the permeable electrode is a cathode or anode, it is within an electrode chamber, that is, it is separated from the other electrode by conventional means, for example an ion-specific ion-permeable membrane such as a Nafion membrane with different anolyte and catholyte or a (micro)perforate inert membrane e.g. a PTFE (Gortex) gauze with a common electrolyte. Such an arrangement has the advantage of separating cathode and anode reactions and thus of minimising undesirable side reactions.

As mentioned previously the permeable electrode, with a relatively large specific surface area, may effectively fill the greater part, or substantially all, of the electrode chamber, and may thus offer a relatively large surface area to electrolyte volume ratio and thus a relatively low cell internal resistance. The permeable electrode, any electrode chamber and membrane and the cell may conveniently be of the lamellar form found in conventional cell presses. Thus the electrode itself may typically be a felt lamella 0.05 to 3 mm thick. The lower end of this range will be inappropriate where it is necessary to continually feed to the electrode a first fluid phase which is depleted by the reaction, since the pressure drop over the electrode due to the thinness of the electrode will not be practically surmountable.

It is also greatly preferred that all the components of the cell such as the electrodes, any electrode chambers including a membrane and any other rotatable member are of the same form with respect to the axis of rotation and of similar transverse dimensions. Thus discoidal and/or annular components of substantially the same overall radius are particularly preferred.

A plurality of such cells, may conveniently be joined in series electrically to give a series cell cascade, i.e. a bipolar arrangement. This arrangement offers a number of advantages. Spatially it is convenient that the cells are arranged to have a common axis of rotation, i.e. they may all be rotated by a common driveshaft. As mentioned hereinbefore each cell may conveniently be lamelliform and provide greater compactness for a given current rating and/or electro-chemical cell or electrode reaction rate. This compactness may be enhanced by making the cells axially contiguous in a cell press, and further enhanced by providing each pair of adjacent cells with a common conductive wall (typically a rotatable member) to provide an anode-cathode connection between adjacent cells. Such an arrangement has the added advantage of eliminating the material and maintenance costs associated with the low-resistance bus-bars necessary for parallel cell banks. Typically, the cells in the cascade will be identical; it is particularly convenient to design the number of cells in the cascade so that the operational voltage drop across the cascade corresponds to a conventional industrial supply voltage for example (440) v.

Accordingly the invention further provides a series cell cascade for electrochemical reaction between two fluid phases one of which is a liquid, characterised by comprising at least two electrode assemblies in accordance with the present invention, in series.

The cascade will in general comprise a plurality of identical electrode assemblies in which the electrodes are of the same polarity. Favoured and preferred assemblies and components thereof in the cascade are as so described hereinbefore.

It will be appreciated that the fluid charging and supply means and fluid collecting means for the anode series and the cathode series within the cell series will respectively be in parallel from a manifold.

For this reason, these means must be so designed and arranged to minimise leakage currents across cells and to avoid shorting-out cells in the series.

Thus, where the first or, less likely, the second fluid phase is electrically conductive, the means for delivering the first fluid, or charging the second fluid, to the permeable electrode, will be highly resistive, for example any connection between the manifold and the electrode chamber will be of maximised length and minimised cross-section.

Similarly, any manifold for removing and/or collecting any of the two fluid phases and/or any reaction product which is conductive will generally be of sufficiently large cross-section and/or of material of relatively high surface tension with respect to the removed and/or collected material, so that the latter will tend to be in dispersed or particulate form in the manifold.

The present invention also provides a process for effecting electrochemical reaction between two fluid phases, the first of which is a liquid, characterised by charging the second fluid phase in parallel to a plurality of rotating permeable electrodes of the same polarity in a series cell cascade.

The processes according to the present invention may be employed in any electrochemical reaction between two fluid phases one of which is a liquid; inter alia for the reduction of the overpotential required to discharge species in the first fluid phase, by removing those species by reaction; and for continuous-mode electrosynthesis: and for fuel cells; where the present apparatus is particularly advantageous in ensuring intimate reactive contact between gaseous second fluids and liquid first fluids.

In the first instance it will not in general be desired to collect the product of the electrochemical reaction. Example of such reactions include the cathodic oxidation of hydrogen ion in an aqueous first fluid phase with any reducible second fluid phase, to reduce the hydrogen overpotential. Examples of suitable reducible second fluid phases include gases and gas mixtures, such as oxygen and air.

The reduction in overpotential in this way may lead to considerable energy savings in conventional electrolytic processes, even taking into account the energy expenditure in operating the present apparatus, and e.g. the loss of electrolytic hydrogen as a recycled energy source.

In the second instance the planned product(s) of a specific electrochemical reaction will in general be collected. Examples of such reactions include the cathodic reduction of any reducible second fluid phase liquid or gas with hydrogen ion, such as phases comprising species which contain oxo or thiooxo groups bonded to carbon, nitrogen, phosphorus or sulphur atoms. Examples of such reactions also include the anodic oxidation of any oxidisable second fluid phase with for example amide, hydroxide or halide ion; the second fluid phase may advantageously be gaseous and may comprise unsaturated species such as alkenes or other oxidisable organic species.

Further features of the apparatus of the invention will now be described in terms of that embodiment in which the second, inwardly flowing fluid is a gas and the first fluid has zero or low total radial flow velocity. The skilled man will however appreciate that similar considerations will apply mutatis mutandis to other embodiments such as those mentioned hereinbefore.

The invention is further described with reference to the accompanying drawings in which.

Figure 1:
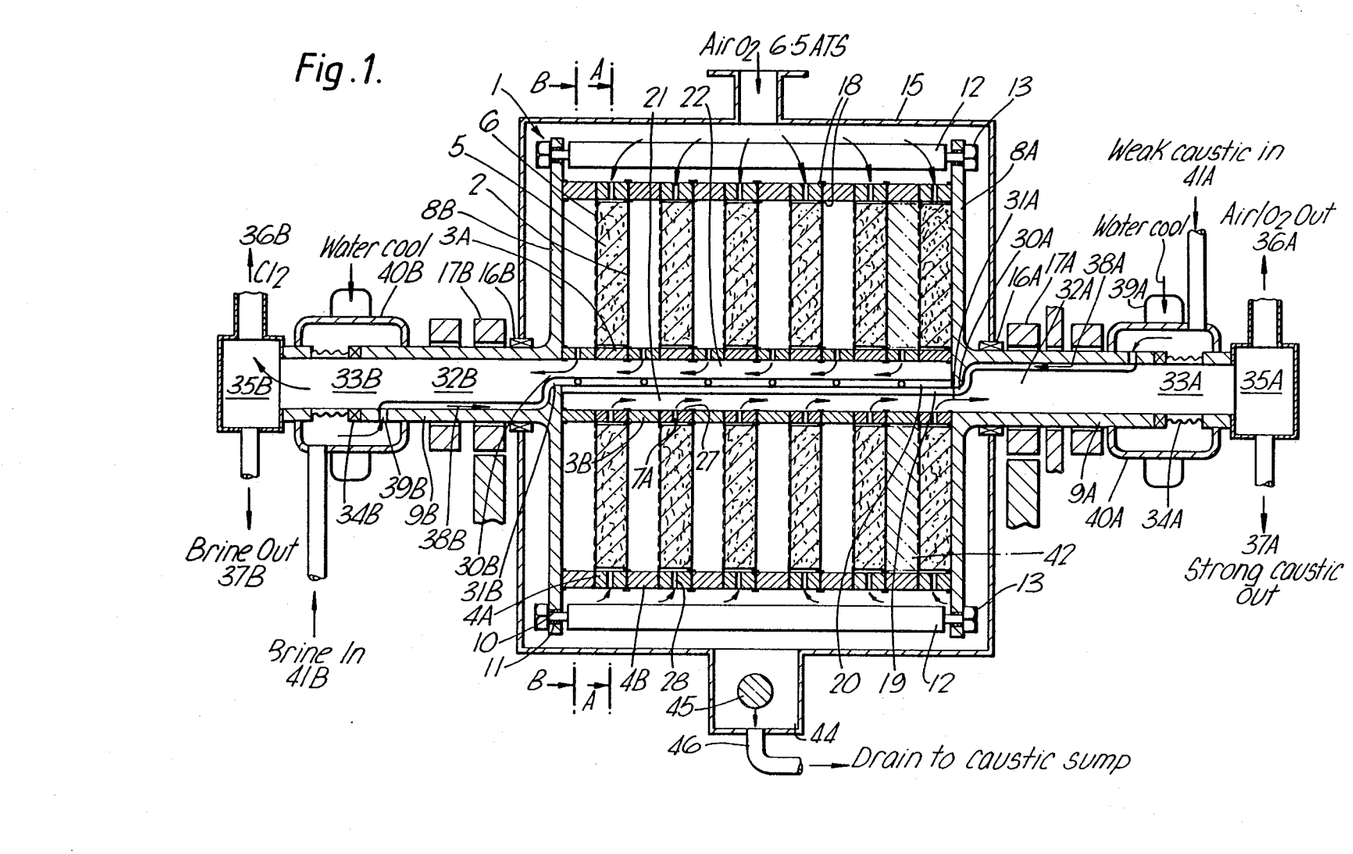
FIG. 1 is a longitudinal section of a series cell cascade comprising a plurality of electrode assemblies in accordance with the present invention.

In FIG. 1, a series cell cascade 1 is made up of a series of identical repeat unit cells, which except for the two end cells of the cascade, consist of a conductive (e.g. titanium) disc 2 having a central joint 3A and a peripheral gasket 4A axially abutting one face, each being insulative and of equal axial thickness. (The gasket 4A is annular, the joint 3A is essentially annular, but described in greater detail hereinafter) and a permeable (metal felt) annular cathode 5 located by and between the joint 3A and gasket 4A, in contact with a discoidal membrane 6, which is either ion-permeable (e.g. Nafion) or inert and (micro)perforate (e.g. Gortex) axially abutting on one face the joint 3A and gasket 4A and on the other a second central joint 3B and second peripheral gasket 4B, each being insulative and of equal axial thickness (the gasket 4B is annular; the joint 3B is essentially annular, but described in greater detail hereinafter). The joint 3B and gasket 4B axially abut the disc 2 of the adjacent repeat unit cell.

Thus, in each cell the disc 2, joint 3A, gasket 4A and membrane 6 define a cathode chamber for retaining a catholyte first fluid phase in contact with the permeable electrode (cathode) 5 enclosed in the chamber.

In each cell the membrane 6, joint 3B, gasket 4B and the disc 2 of the adjacent repeat unit cell define an anode chamber for anolyte, the disc 2 of the adjacent cell being the anode of this cell and the anode-cathode bridge between this and the adjacent cell. The disc 2 may serve as an anode, or the chamber may be filled with an annular felt anode 42 similar to the cathode.

Figure 2:
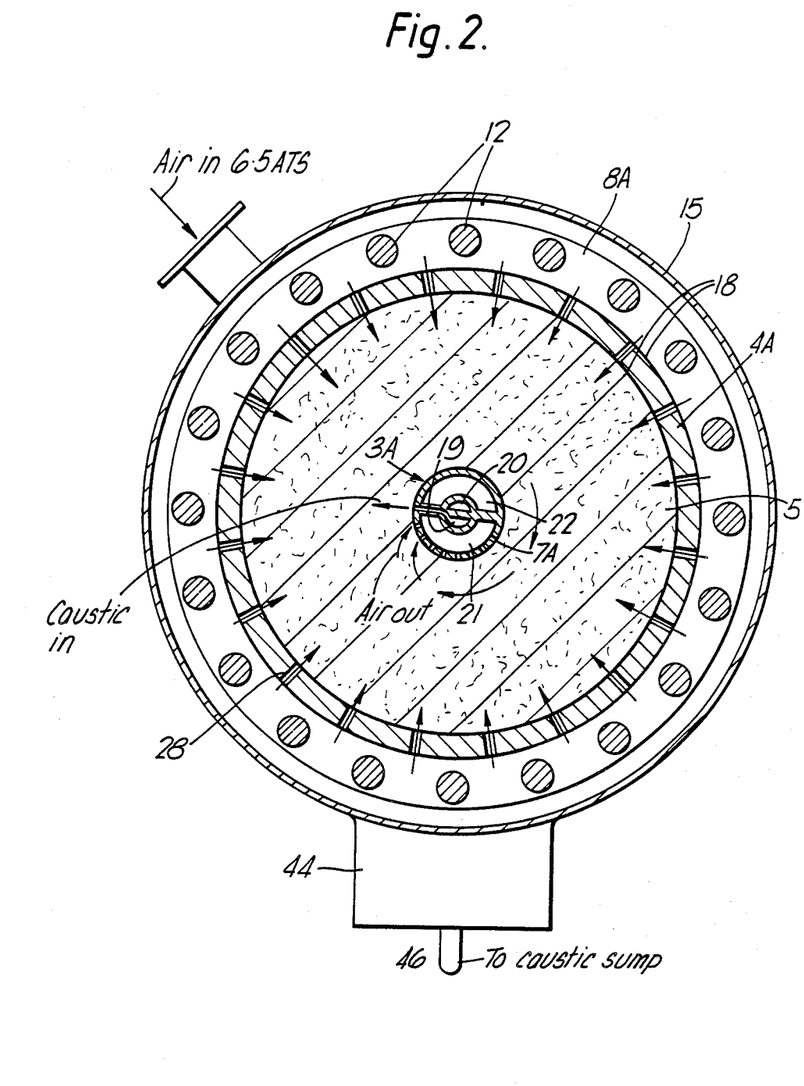
FIG. 2 is a transverse section of the cell cascade of FIG. 1 along the line AA.

In FIGS. 1 and 2, each gasket 4A has a plurality of radial inlet ports, 28 which may be radial perforations through, and/or radial channels in a face of, the gasket 5A, and which are means for charging a gaseous second fluid phase to the cathode 5. In this particular embodiment they are disposed uniformly about the gasket periphery.

Figure 3:
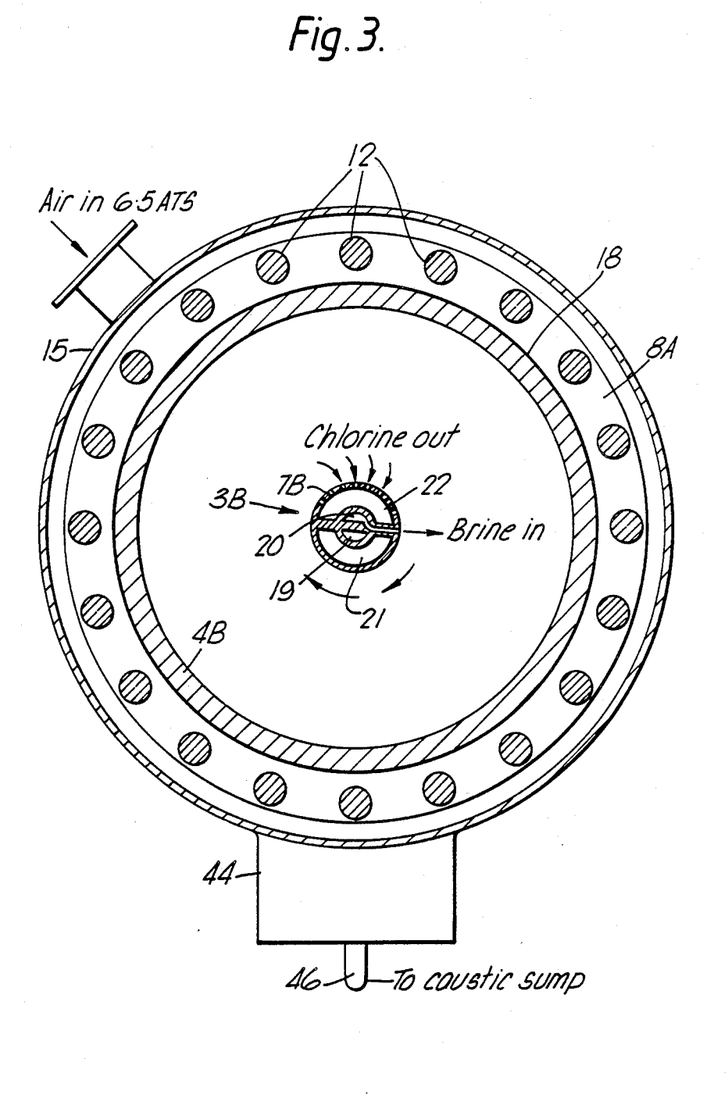
FIG. 3 is a transverse section of the cell cascade of FIG. 2 along the line BB.

In FIGS. 1, 2 and 3, each central joint 3A has a plurality of outlet ports 7A which may be radial perforations through, and or radial channels in a face of the joint 4A and which are inter alia means for removing a reaction product of the two phases from the cathode 5 in its chamber. In this particular embodiment they are disposed uniformly about half the joint periphery.

The two end cells of the cascade are provided in place of conductive discs 2 as their outer axial faces, with conductive flanges 8A and 8B of slightly greater radius, and integral with hollow half-shafts 9A and 9B, which may be respectively positively and negatively charged as described hereinafter. Each flange 8A or 8B has the same number of axial holes 10 uniformly disposed about its periphery, each fitted with an insulative grommet 11 and axially in register with a hole 10 in the other flange 8B or 8A respectively. Through each axial pair of holes 10 pass elongate clamping bolts 12 with nuts 13 which may be self-locking (as shown) or provided with other conventional locking means such as locking nuts or washers or flanged washers each with a lug and set-pin (not shown). These bolts 12 and nuts 14 clamp the half-shafts 9A and 9B into a rigid, rotatable cascade assembly. (Pairs of concentric annular lips 18 on the faces of the discs 2 and flanges 8A and 8B locate the joints 3A and 3B and gaskets 4A and 4B in the clamped assembly. The assembly is rotatably mounted in a housing 15 in insulative bearings 16A and 16B and there are means for rotating the assembly, and hence the cathode, such as an electric motor and belt or fluid clutch drive (not shown). Slip rings 17A and 17B about the half-shafts 9A and 9B are means for charging the flanges 8A and 8B respectively positive and negative.

The skilled man will appreciate that, although this specific embodiment is described in terms of a permeable cathode for a cathodic reaction with a gaseous second fluid phase, the cascade may be arranged and used, mutatis mutandis in a self-evident manner with a permeable anode for a similar anodic reaction; or with a permeable cathode and anode for cathodic and anodic reactions with the same or different cathodic and anodic second fluid phases.

The skilled man will also appreciate that if it is desired to use a liquid second fluid phase, different embodiments of the cascade may be necessary, in particular as regards the specific design of the means for charging the second fluid phase to the permeable electrode and of the electrode itself.

Further details of the cascade relate to the solution of problems associated with the use of a cascade rather than a single cell and are thus inessential to the cell per se.

Some of these details such as catholyte and anolyte feeds also relate to the specific use of the described embodiment for the electrolysis of brine anolyte to give chlorine with the cathoid oxidation of hydrogen ion in caustic soda (first fluid phase) catholyte by (second fluid phase) air or oxygen. The total cell reaction may be represented as:

$$4H^+ + 4Cl^- + O_2 \rightarrow 2H_2O + 2Cl_2$$

These specific details may thus be inessential to the cascade when used in other reactions.

In the specific embodiment, it will be seen that it is necessary to feed fresh brine anolyte continuously to the anode chamber to compensate for electrolytic depletion, and to provide outlet and collection means for the chlorine evolved. Similarly it is necessary to feed fresh catholyte caustic continuously to the cathode chamber to compensate for dilution by the water produced and for depletion by catholyte carried out of the chamber in the air or oxygen stream through outlet ports 7A.

As mentioned hereinbefore it is necessary to ensure that any inlet feed and outlet collection manifolds and the liquid rates therethrough are designed to minimise leakage currents therethrough and to avoid the shorting-out of any cell in the cascade.

In FIGS. 1, 2 and 3 the cascade is provided with a caustic (catholyte) inlet manifold 19 and a brine (anolyte) inlet manifold 20, each of semicircular cross-section and disposed with their plane walls adjacent to each other on opposite sides of the cascade axis 21.

Concentric with the caustic inlet manifold 19 and brine inlet manifold 20 respectively are a caustic (catholyte) outlet manifold 21 and a brine anolyte and chlorine outlet manifold 22, each of semi-annular cross section.

Figure 4:
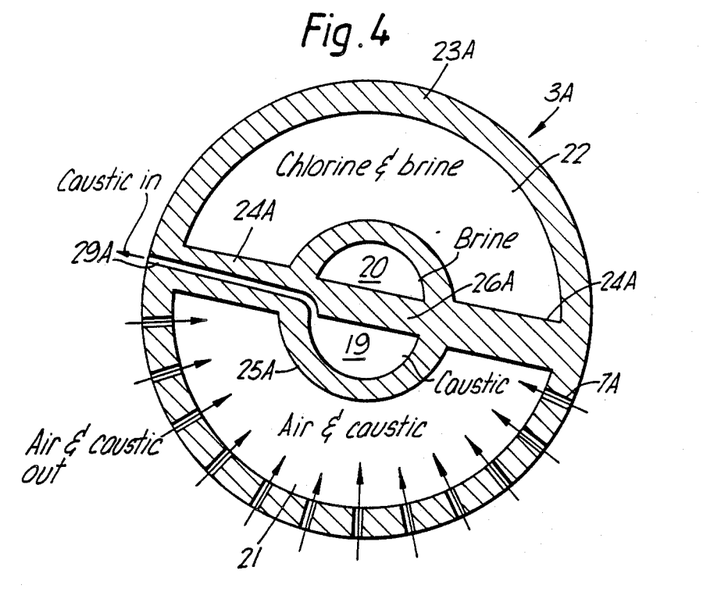
FIG. 4 is an enlarged view of a centre joint 3A of FIG. 2, depicted in its orientation in FIGS. 1 and 2.

The walls of the inlet manifolds 19 and 20 are defined by the centre joints 3A and 3B, and those of the outlet manifolds 21 and 22 by the discs 2, centre joints 3A, membranes 6 and centre joint 3B, as follows:

In FIG. 4 a centre joint 3A consists of an outer annulus 23A joined by webs 24A to an inner annulus 25A bisected by a brace 26A. The outer annulus 23A webs 24A and inner annulus 25A define spaces which are parts of the outlet manifolds 21 and 22, and the inner annulus 25A and brace 26A define spaces which are parts of the inlet manifolds 19 and 20. Each disc 2 and membrane 6 has a circular aperture 27 which is so dimensioned, and the cascade assembly is so mounted, that it is in register with the inner periphery of the outer annulus 23A, which latter thus abuts a disc 2 or membrane 6 in the cascade assembly.

The webs 24A, inner annulus 25A and brace 26A stand proud of the faces of the outer annulus 23A by approximately half the thickness of the disc 2 or membrane 6 respectively when compressed in the cascade press.

Radial outlet ports 7A which pass radially through the outer annulus 23A or are channels in that face thereof which abuts the membrane 6 in the cascade assembly, communicate between the caustic outlet manifold 21 and the outer periphery of the outer annulus 23, that is the cathode chamber in the cascade assembly.

A radial inlet 29A, which passes radially through a web 24 or is a channel in that face of the web nearest the membrane 6 in the cascade assembly, communicates between the caustic inlet manifold 19 and the outer periphery of the outer annulus 23 or cathode chamber.

Figure 5:
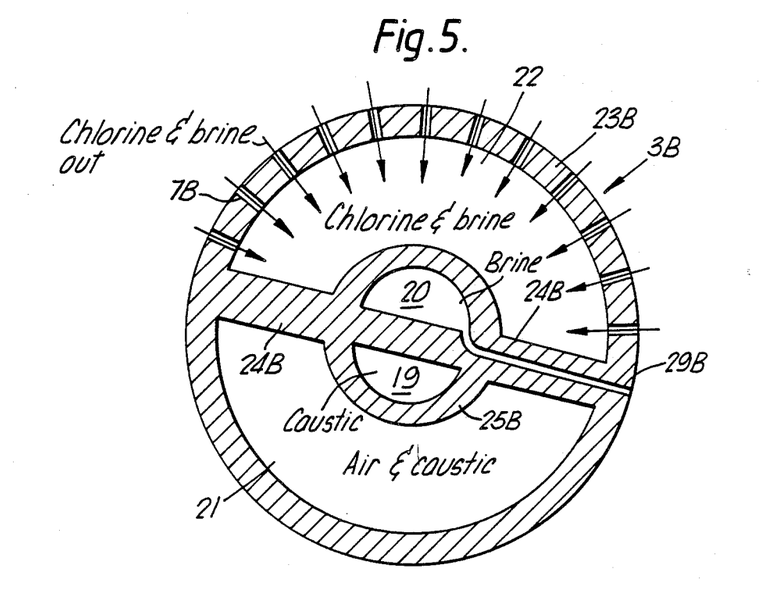
FIG. 5 is an enlarged view of a centre joint 3B of FIG. 3 depicted in its orientation in FIGS. 1 and 3.

In FIG. 5 a centre joint 3B is similar to a joint 3A in corresponding essential features via outer annulus 23A, webs 24B, inner annulus 25B and brace 26B, but is mounted in the cascade assembly rotated through 180° with respect to each corresponding joint 3B.

Thus, radial outlet ports 7B, which, if channels, are again in that face of the outer annulus 23B which abuts the membrane 6 in the cascade assembly, communicate between the brine and chlorine outlet manifold 22 and the anode chamber in the cascade assembly.

Similarly radial inlet 29B, which, if a channel, is again in that face of the outer annulus 23B nearest to the membrane 6 in the cascade assembly, communicates between the brine inlet manifold and the anode chamber in the cascade assembly.

At one end of the cascade, the centre of cathodic flange 8A has a semi-annular aperture 30A in register with the caustic outlet manifold 21 and a semi-circular opening 31A in register with the caustic inlet manifold 19.

The aperture 30A communicates with the interior 32A of the hollow half-shaft 9A and thence via the hollow interior 33A of axial bearing 34A to an air-caustic separator 35A with air outlet 36A and caustic outlet 37A.

The interior 33A of the half-shaft 9A is provided with a caustic inlet pipe 38A running between the opening 31A and a caustic inlet port 39A, which opens into the interior of a water cooled radial bearing 40A. The bearing 40A has a caustic inlet 41A.

Similarly, at the other end of the cascade, the centre of anodic flange 8B has a semi-annular 30B in register with the brine outlet manifold 22 and a semi-circular opening 31B in register with the brine inlet manifold 20.

The aperture 30B communicates with the interior 32B of the hollow half-shaft 9B and thence via the hollow interior 33B of axial bearing 34B to chlorine-brine separator 35B with chlorine outlet 36B and brine outlet 37B.

The interior 33B of the half-shaft 9B is provided with a brine inlet pipe 38B running between the opening 31B and a brine inlet port 39B, which opens into the interior of a water-cooled radial bearing 40B. The bearing 40B has a brine inlet 41B.

As mentioned hereinbefore the radial inlet ports 28 in the gaskets 4A are means for charging a gaseous second fluid phase (here air or oxygen) to each cathode 5. The ports 28 communicate with the interior of the housing 15, which has an air/oxygen inlet 43 and a sump 44 with a ball-valve 45 in a caustic outlet 46. The latter handles any catholyte leakage from the inlet ports 28.

In operation, first fluid phase caustic solution at 70° C. is fed to permeate each cathode 5 from the caustic inlet 41A via the bearing 40A, inlet pipe 38A, caustic inlet manifold 19 and radial inlet 29A, and escapes from the cathode 5 via the radial outlet ports 7A, caustic outlet manifold 21, half-shaft interior 33A, and bearing interior 33A to the separator 35A.

At the same time, brine also at 70° C. is fed to each anode 42 from the brine inlet 41B via the bearing 40B, inlet pipe 38B, brine inlet manifold 20 and radial inlet 29B and escapes from the anode 42 via the radial outlet ports 7B, brine outlet manifold 22, half-shaft interior 33B and bearing interior 33B to the separator 35B.

The cathodic flange 8A is charged negatively via the slip ring 17A, and the anodic flange 8B is charged positively via the slip-ring 17B, to a potential difference of (about) 15 v.

Each cathode 5 in the cascade is rotated by driving the half-shaft 9A, via a pulley or pinion 46 mounted on the half-shaft 9A, with an electric motor (not shown).

Second fluid phase air is charged to each cathode 5 from the air inlet 43 at 6.5 ats via the housing 15 and inlet ports 28, and permeates each cathode 5 from the ports 28 and is removed from each cathode 5 via the same route as the caustic, described hereinbefore, together with water produced by the cathode reaction.

Chlorine produced anodically escapes from each anode 42 by the same route as the brine, described hereinbefore.

I claim:

1. An electrode assembly for effecting electrochemical reaction between two fluid phases, the first of which is liquid, which apparatus is characterised by an electrode permeable to the fluids and means for electrically charging the same, said electrode being rotatable about an axis thereof, means centrally of said electrode for supplying the first fluid phase to the electrode, means for containing the said first fluid phase in contact with the electrode so that the electrode is permeated by said first fluid phase, means for charging the second fluid phase to the electrode at a radial extremity thereof, means centrally of the electrode for removing a reaction product of the two phases from the electrode, and means for rotating the electrode about said axis, such that when the second fluid phase is charged to the electrically charged, rotating electrode permeated with the first fluid phase, the second fluid phase permeates the electrode from the point of charging so as to react with said first fluid phase and the resulting reaction product is removed from the electrode.

2. An electrode assembly according to claim 1 wherein the permeable electrode is a chemically resistant metal gauze or felt.

3. An electrode assembly according to claim 1, wherein the permeable electrode is an annulus.

4. An electrode assembly according to claim 1, constructed for the second fluid being a gas and for countercurrent flow of the first and second fluids.

5. An electrode assembly according to claim 4 wherein the assembly is rotatably supported in a housing to form a space between the assembly radially outer surface and the housing inner surface from which space the gaseous second fluid may be charged via a plurality of charging orifices to the permeable electrode.

6. An electrode assembly according to claim 1 having a horizontal axis of rotation.

7. A series cell cascade for electrochemical reaction between two fluid phases one of which is a liquid, characterised by at least two electrode assemblies according to claim 1 in series each assembly being comprised in a lamelliform cell and each pair of adjacent cells having a common conductive wall to provide an anode-cathode connection between adjacent cells.

* * * * *